United States Patent
Murakami et al.

(10) Patent No.: US 9,413,040 B2
(45) Date of Patent: Aug. 9, 2016

(54) SECONDARY BATTERY UNIT

(71) Applicants: Manabu Murakami, Saku (JP); Shigenori Kawana, Fuchu (JP); Sakae Kawashima, Fussa (JP); Shuji Kikuchi, Koganei (JP)

(72) Inventors: Manabu Murakami, Saku (JP); Shigenori Kawana, Fuchu (JP); Sakae Kawashima, Fussa (JP); Shuji Kikuchi, Koganei (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 814 days.

(21) Appl. No.: 13/661,611

(22) Filed: Oct. 26, 2012

(65) Prior Publication Data
US 2013/0108905 A1    May 2, 2013

(30) Foreign Application Priority Data
Oct. 28, 2011    (JP) .................................. 2011-237756

(51) Int. Cl.
| | |
|---|---|
| *H01M 10/42* | (2006.01) |
| *H01M 2/10* | (2006.01) |
| *H01M 2/20* | (2006.01) |
| *H01M 10/48* | (2006.01) |

(52) U.S. Cl.
CPC .......... *H01M 10/425* (2013.01); *H01M 2/1077* (2013.01); *H01M 2/206* (2013.01); *H01M 10/482* (2013.01); *H01M 2220/10* (2013.01)

(58) Field of Classification Search
None
See application file for complete search history.

(56) References Cited

U.S. PATENT DOCUMENTS

| | | | |
|---|---|---|---|
| 8,994,300 B2 * | 3/2015 | Ohkura ........................ | 318/139 |
| 2001/0033502 A1 | 10/2001 | Blair et al. | |
| 2004/0160214 A1 | 8/2004 | Blair et al. | |

FOREIGN PATENT DOCUMENTS

| | | |
|---|---|---|
| CN | 101517779 A | 8/2009 |
| EP | 1355404 | 10/2003 |
| EP | 1462813 B1 | 5/2007 |
| JP | 2008276991 A | 11/2008 |
| JP | 2009-011083 | 1/2009 |
| JP | 2013058478 A | 3/2013 |
| WO | 0173914 | 10/2001 |
| WO | 2008035873 | 3/2008 |
| WO | 2011089910 A1 | 7/2011 |

OTHER PUBLICATIONS

Office Action issued in related Chinese Patent Application No. 201210417522.2 mailed Sep. 26, 2014, 26 pages.
European Search Report dated Feb. 13, 2013.
(Continued)

*Primary Examiner* — Sarah A Slifka
(74) *Attorney, Agent, or Firm* — Baker Botts L.L.P.

(57) ABSTRACT

According to one embodiment, a unit includes battery modules each including an assembled battery including battery cells and a monitoring device, a BMU to communicate with the battery modules, a first drawer holding the battery module, a second drawer holding the BMU, and a housing containing the first drawer and the second drawer. The first and second drawers include first composite connectors secured to a side of the housing, which is almost orthogonal to a direction in which to insert the drawers into the housing. The housing has second composite connectors which mate with the first composite connectors, thereby to connect communication lines between the monitoring device and the BMU and the main-circuit lines between the assembled batteries of the battery modules.

10 Claims, 8 Drawing Sheets

(56) References Cited

OTHER PUBLICATIONS

First Office Action issued in related Japanese Application No. 2011-237756, mailed on Jul. 28, 2015 (8 pages with translation).

Office Action issued in related EP patent appln. No. 12189985.0, mailed Jan. 29, 2016 (5 pages).

* cited by examiner

SECONDARY BATTERY UNIT

CROSS-REFERENCE TO RELATED APPLICATIONS

This application is based upon and claims the benefit of priority from Japanese Patent Application No. 2011-237756, filed Oct. 28, 2011, the entire contents of which are incorporated herein by reference.

FIELD

Embodiments described herein relate generally to a secondary battery unit.

BACKGROUND

Battery apparatuses for use as power supplies in smart grids or vehicles such as electric cars, each apparatus comprising battery units connected together, has been proposed in recent years.

Any battery apparatus comprises many battery cells connected in series and in parallel. More precisely, as many battery cells (for example, 10 cells) as required to achieve safety even if they are short-circuited are connected in series, forming one row. Several cell rows are connected in parallel, constituting one assembled battery. Then, some assembled batteries are connected in series, providing a battery unit. Further, some battery units are connected in parallel, thereby providing a battery apparatus.

The main-circuit output (i.e., output at the anode and cathode terminals) of the battery apparatus are connected to a power conditioner (PCS), and a charge/discharge current flows in the battery apparatus. A large-scale battery system may comprise such battery apparatuses connected in parallel.

Lithium ion batteries may constitute a battery apparatus. In this case, the batteries must be monitored in terms of voltage and temperature, and the difference between the batteries in terms of remaining power must be reduced, in order to use the battery apparatus in safety for a long time. Further, each battery module must be charged or discharged, or must not be charged or discharged, in accordance with the estimated amount of remaining power and the result of self-examination of the module. To this end, assembled battery monitoring devoices (i.e., cell management units, CMU) are used for respective assembled batteries, and are connected by communication lines.

DETAILED DESCRIPTION

In general, according to one embodiment, a battery unit comprises a plurality of battery modules each comprising an assembled battery including a plurality of battery cells and an assembled battery monitoring device configured to detect the temperature and voltage of each battery cell; a battery management device configured to communicate with the battery modules; a first drawer holding the battery module; a second drawer holding the battery management device; and a housing containing the first drawer and the second drawer. The first drawer and the second drawer comprise first composite connectors secured to a side of the housing, which is almost orthogonal to a direction in which to insert the drawers into the housing. The housing has second composite connectors which mate with the first composite connectors when the first drawer and the second drawer are inserted into the housing, thereby to connect communication lines between the assembled battery monitoring device and the battery management device and the main-circuit lines between the assembled batteries of the battery modules.

The battery unit according to the embodiment will be described with reference to the accompanying drawings.

Figure 1:
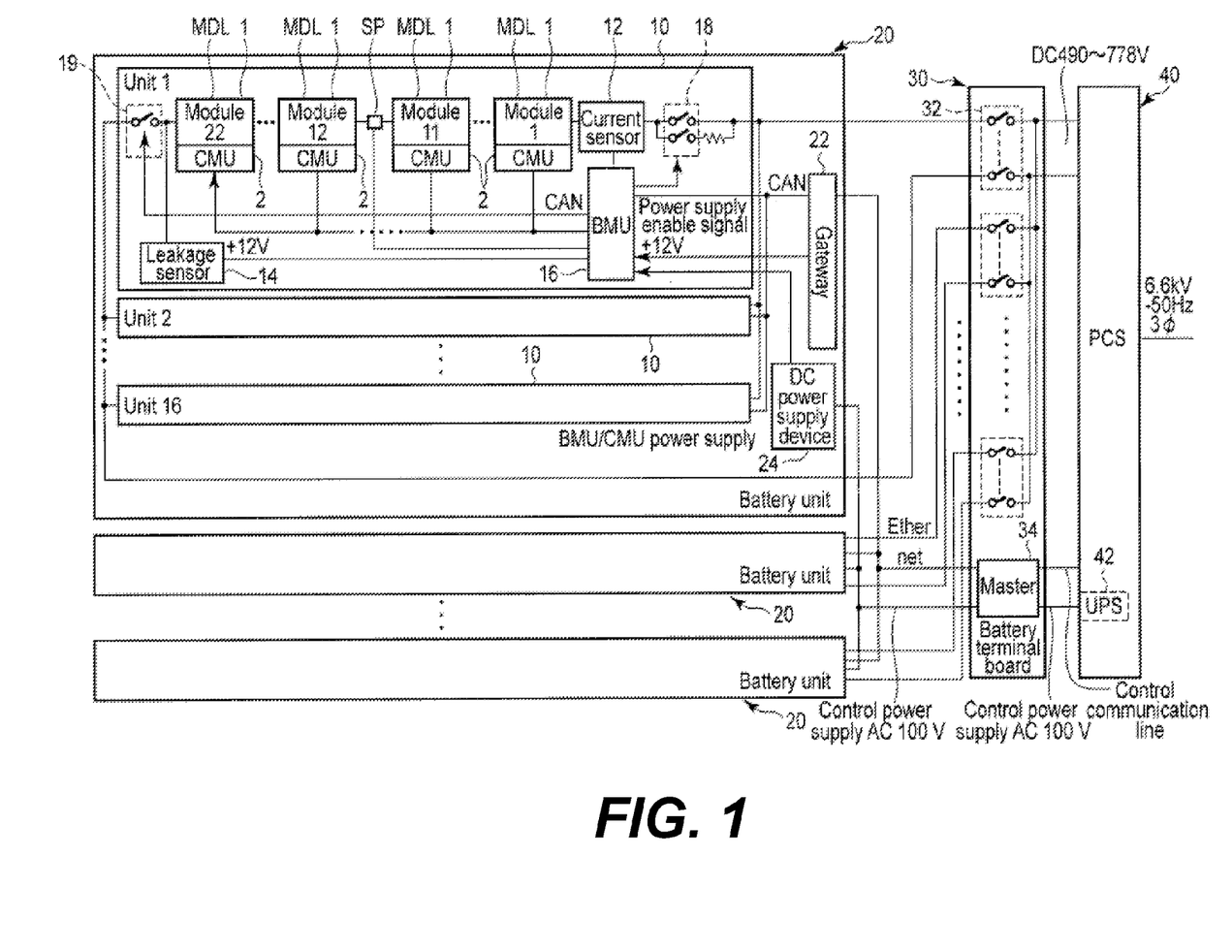
FIG. 1 is a block diagram explaining an exemplary battery system including battery units according to an embodiment.

FIG. 1 is a block diagram showing an exemplary battery system having battery units according to an embodiment.

The battery system comprises a plurality of battery devices 20, a battery terminal board 30, and a power conditioner (PCS) 40. The battery terminal board 30 holds the wires extending from the battery devices 20 and connected in parallel.

The power conditioner 40 has the interactive DC conversion function of charging and discharging power between a power system (not shown) and the battery devices 20, and comprises an uninterruptible power supply (UPS) 42 configured to supply control power to the battery terminal board 30. The uninterruptible power supply 42 supplies an AC power supply voltage of 100 V to the battery terminal board 30.

The battery terminal board 30 is provided between the battery devices 20, on the one hand, and the power conditioner 40, on the other, and is connected to each battery device 20 and the power conditioner 40. The battery terminal board 30 comprises switching means 32 and a master unit 34. Each switching means 32 connects the main-circuit wire of one battery device 20 to the power conditioner 40. The maser unit 34 is connected to the communication lines of the battery devices 20 and also to control power supply lines.

The master unit 34 receives power from the power conditioner 40 and supplies an AC power supply voltage of 100 V as a control power source to the battery devices 20. The master unit 34 also receives control data from the battery devices 20 through communication lines or control data from the power conditioner 40 through a control communication line. In accordance with the control data received, the master unit 34 controls the switching means 32, switching the connection of the power conditioner 40 to the battery devices 20. The master unit 34 communicates with the battery devices 20 in accordance with the Ethernet (registered trademark) standard.

Each battery device 20 comprises a plurality of battery units 10, a gate control device 22, and a DC power supply device 24.

The gate control device 22 communicates with the master unit 34 of the power conditioner 40 in accordance with the Ethernet standard, and communicates with the battery units 10 in accordance with the control area network (CAN) standard. The gate control device 22 is also known as a "gateway." The gate control device 22 receives a signal and distributes the signal to the master unit 34 and the battery units 10. Further, the gate control device 22 may convert the identifier of the signal, changing the signal to a signal that accords with the Ethernet standard and the CAN standard. Note that the gate control device 22 according to this embodiment can communicate with at most 16 battery units 10. The gate control device 22 may be included in each battery unit 10.

The DC power supply device 24 converts the AC power supply voltage of 100 V applied from the master unit 34 of the power conditioner 40 to a DC power supply voltage, and applies the DC power supply voltage to the battery units 10. More precisely, the DC power supply voltage of 12 V is applied to the battery units 10.

Each of the battery units 10 comprises a plurality of battery modules MDL, a battery management unit (BMU) 16, a current sensor 12, a leakage sensor 14, switch devices 18 and 19, and a service plug SP.

Each battery module MDL comprises an assembled battery 1 and an assembled battery monitoring device 2. The assembled battery 1 includes a plurality of battery cells (not shown). The assembled battery monitoring device 2 (for example, CMU (cell management unit)) is configured to monitor the voltage and temperature of the battery cells constituting the assembled battery 1. The assembled battery 1 includes 24 battery cells of, for example, 20 Ah. More precisely, the assembled battery 1 has two rows of battery cells, each row composed 12 battery cells connected in series, and the battery cells of one row are connected in parallel with those of the other row, respectively. Each battery unit 10 shown in FIG. 1 has 22 battery modules MDL connected in series.

In each battery unit 10, the current sensor 12 keeps measuring the current flowing in the main-circuit wire of the battery device 20 while the battery device 20 is operating. The current sensor 12 is connected in series to the high-potential end of the series circuit of the battery modules MDL.

The leakage sensor 14 detects whether the battery unit 10 has been grounded or short-circuited. More specifically, the leakage sensor 14 detects the current leaking between the lowest potential point and the earth in the battery unit 10. To detect the leakage current, the leakage sensor 14 detects the voltage at the low-potential end of the series circuit of the battery modules MDL.

The service plug SP is provided to achieve protection in the event of short-circuiting within and without the battery unit 10. The service plug SP includes a fuse connecting two adjacent intermediate battery modules MLD. The configuration of the service plug SP is not limited to this, so long as the service plug SP can cuts the electrical connection of the battery modules.

The switch device 18 is provided on that part of three main-circuit wire, which is connected to the high-potential (anode) end of the series circuit of the battery modules MDL, and is, for example, a contactor (i.e., electromagnetic contactor). The switch device 19 is provided on that part of three main-circuit wire, which is connected to the low-potential (cathode) end of the series circuit of the battery modules MDL, and is, for example, a contactor (i.e., electromagnetic contactor). When controlled by the control of the battery management unit 16, the switch devices 18 and 19 connect the battery unit 10 to the battery terminal board 30, or disconnect the battery unit 10 from the battery terminal board 30.

The battery management unit 16 communicates with the battery terminal board 30 through the gate control device 22, and also with the assembled battery monitoring devices 2 of the battery modules MDL. The battery management unit 16 receives the DC power supply voltage of 12 V from the DC power supply device 24 and applies this DC power supply voltage to the assembled battery monitoring devices 2 of the battery modules MDL. The battery management unit 16 uses the value of the current received from the current sensor 12 and the voltages on the battery cells and the temperatures of the assembled batteries 1 received from the assembled battery monitoring devices 2, thereby averaging the voltages on the battery cells. Thus, the battery management unit 16 monitors the battery cells, detecting whether the battery cells are excessively charged or discharged.

Figure 2:
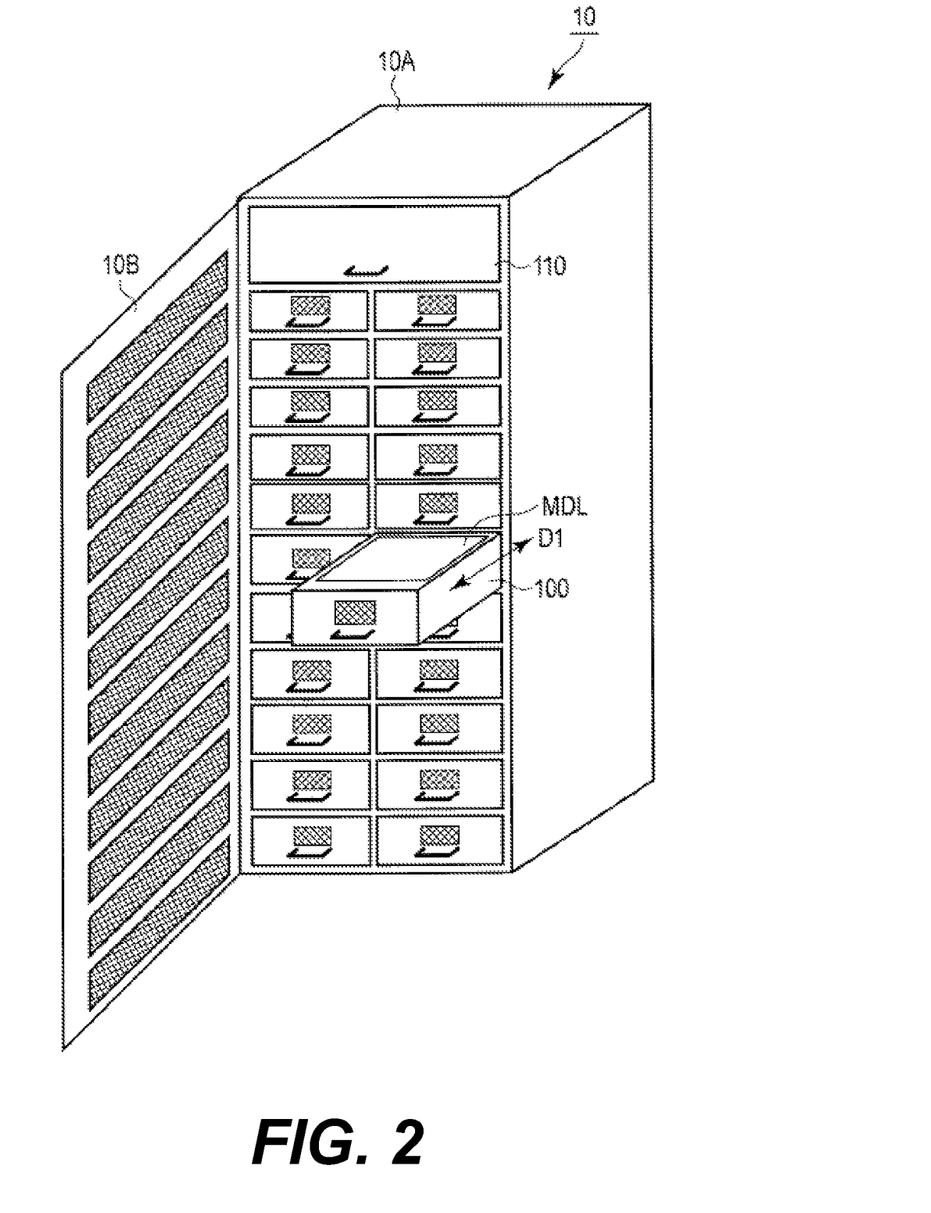
FIG. 2 is a diagram schematically showing an exemplary configuration of the battery unit according to the embodiment.

FIG. 2 is a diagram schematically showing an exemplary configuration of each battery unit 10 shown in FIG. 1.

Each battery unit 10 has first drawers 100, a second drawer 110, a door 10B, and a housing 10A. The first drawers 100 hold the battery modules MLD, respectively. The second drawer 110 holds the current sensor 12, leakage sensor 14, switch devices 18 and 19, battery management unit 16 and DC power supply device 24. The housing 10A contains the first drawer 100 and the second drawer 110.

The housing 10A is a box opening at one side. The housing 10A has a plurality of shelves holding the first drawers 100, respectively, and a shelf holding the second drawer 110. The shelf holding the second drawer 110 is provided in the uppermost part of the housing 10A. The shelves holding the first drawers 100 are arranged below the shelf holding the second drawer 110, in left and right columns, each column consisting of 11 shelves.

The door 10B is secured to the housing 10A to open and close the opening of the housing 10A. The door 10B has vent holes, which make the interior of the housing 10A communicate with the outside.

Figure 3:
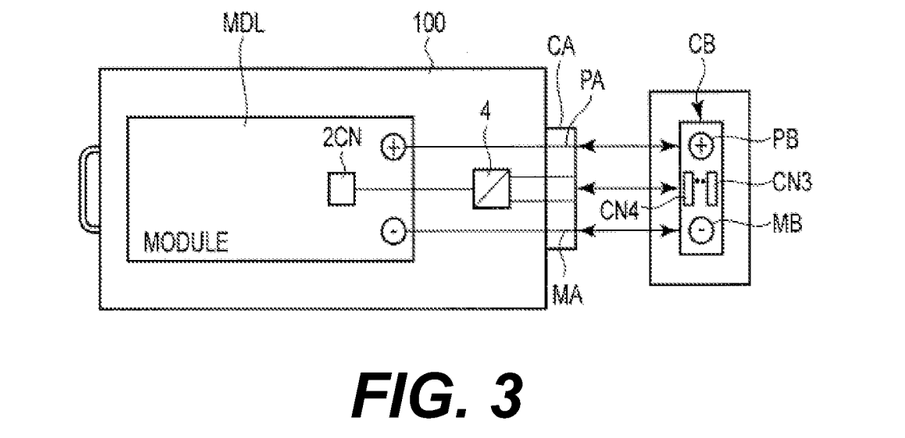
FIG. 3 is a diagram explaining how battery modules are connected in the housing of the battery unit shown in FIG. 2.

FIG. 3 is a diagram explaining how each first drawing 100 is connected to the battery modules are connected in the housing 10A.

Each first drawing 100 has a branching connector 4 and a first composite connector CA. The branching connector 4 is connected to the second communication means (not shown) of the battery module MLD by the connector 2CN incorporated in the assembled battery monitoring device 2 of the battery modules MDL.

The first composite connector CA has an anode terminal PA, a cathode terminal MA, and two communication connectors CN1 and CN2 (shown in FIG. 4) as a first connector. The anode terminal PA is electrically connected to the anode of the battery modules MDL. The cathode terminal MA is electrically connected to the cathode. Communication connectors CN1 and CN2 branch from the connector 2CN of the assembled battery monitoring device 2, and constitute the branching connector 4. When the first drawing 100 is inserted, the first composite connector CA is secured to that side of the housing 10A, which faces away from the back of the housing 10A almost orthogonal to the direction (i.e., first direction) in which the first drawing 100 is inserted.

The housing 10A has a second composite connector CB that can mate with the first composite connector CA of the first drawing 100. The second composite connector CB has an anode connecting part PB, a cathode connecting part MB, and communication connectors CN3 and CN4 as a second connector. The anode connecting part PB and the cathode connecting part MB are configured to mate with the anode terminal PA and cathode terminal MA of the first composite connector CA, respectively. Communication connectors CN3 and CN4 are configured to mate with communication connectors CN1 and CN2 of the first composite connector CA, respectively.

Figure 4:
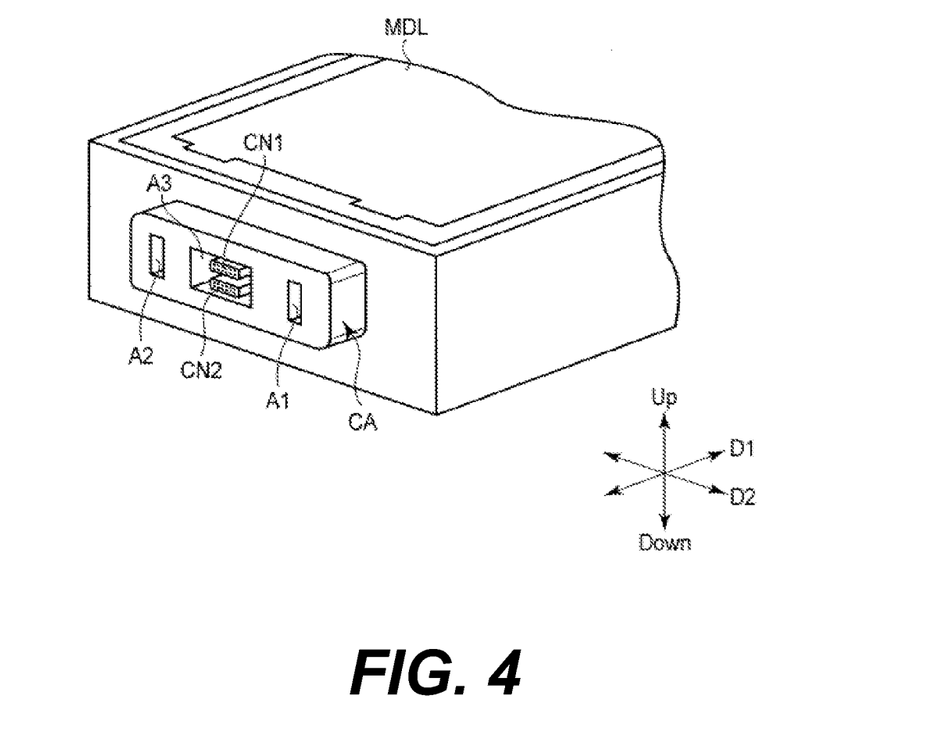
FIG. 4 is a diagram explaining an exemplary configuration of a drawing holding the battery module of the battery unit shown in FIG. 2.

FIG. 4 is a diagram explaining an exemplary configuration of the first composite connector CA of each first drawing 100. The first composite connector CA has three recesses A1, A2 and A3. Recess A1 guides the anode connecting part PB into engagement with the anode terminal PA. Recess A2 guides the cathode connecting part MB into engagement with the cathode terminal MA. Recess A3 guides communication connectors (i.e., second communication connectors) CN3 and CN4 into engagement with communication connectors CN1 and CN2 (i.e., first communication connectors), respectively.

Recesses A1, A2 and A3 extend in the first direction D1 in which to insert the first drawer 100. Recesses A1, A2 and A3 are arranged in the second direction D2 almost orthogonal to the first direction D1, or the vertical direction. Recess A3 is arranged between recesses A1 and A2. Communication connectors CN1 and CN2 are positioned in recess A3, arranged one above the other.

Figure 5:
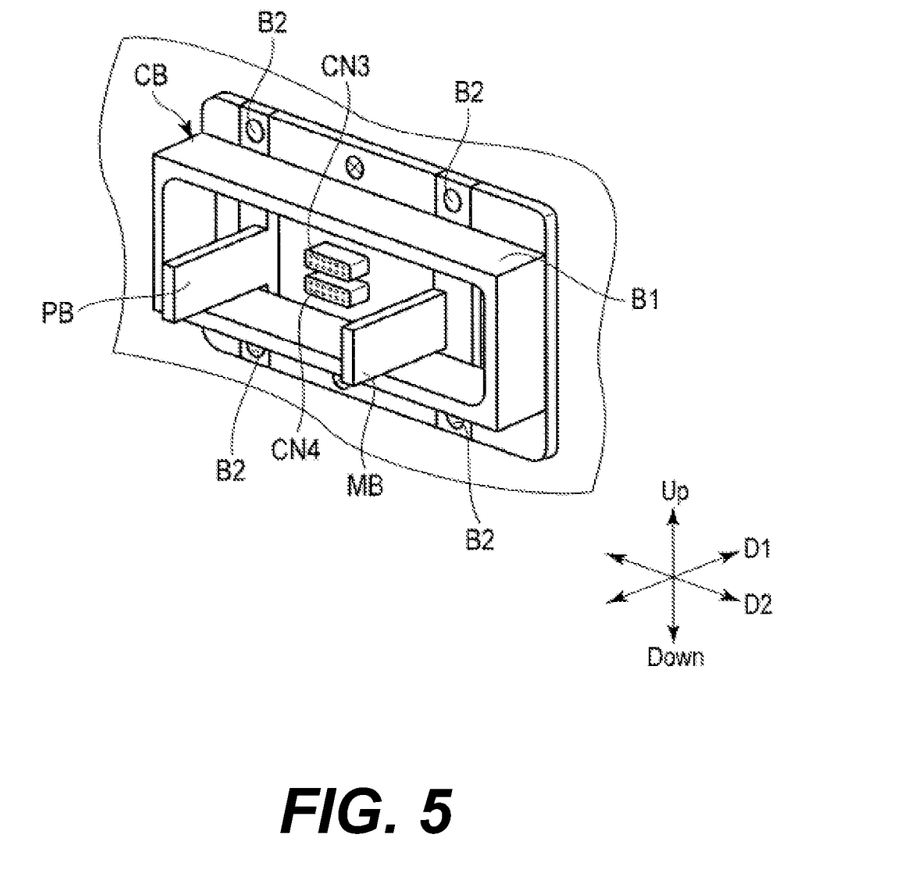
FIG. 5 is a diagram showing an exemplary configuration of the housing of the battery unit shown in FIG. 2.

FIG. 5 is a diagram schematically showing an exemplary configuration of the second composite connector CB of the housing 10A. The second composite connector CB has a frame B1, which mates with the first composite connector CA.

The anode connecting part PB and the cathode connecting part MB are arranged in a region surrounded by the frame B1, and protrude in the direction D1 in which the first drawing 100 is inserted. The anode connecting part PB and the cathode connecting part MB are electrically connected to connection bars (described later) at connection parts B2 arranged outside the frame B1.

Communication connectors CN3 and CN4 are arranged in the region surrounded by the frame B1, one positioned above the other. Communication connectors CN3 and CN4 are arranged between the anode connecting part PB and the cathode connecting part MB, in the second direction D2.

The first composite connector CA and the second composite connector CB are so aligned with each other that one may fit into the other when the first drawing 100 is inserted into the shelf provided in the housing 10A. The first composite connector CA is secured also to that side of the second drawer 110, which faces the back of the housing 10A, which back is almost orthogonal to the direction (i.e., first direction) D1 in which to insert the first drawer 100. To the back of the housing 10A, the second composite connector CB is secured, mating with the first composite connector CA of the second drawer 110.

Figure 9:
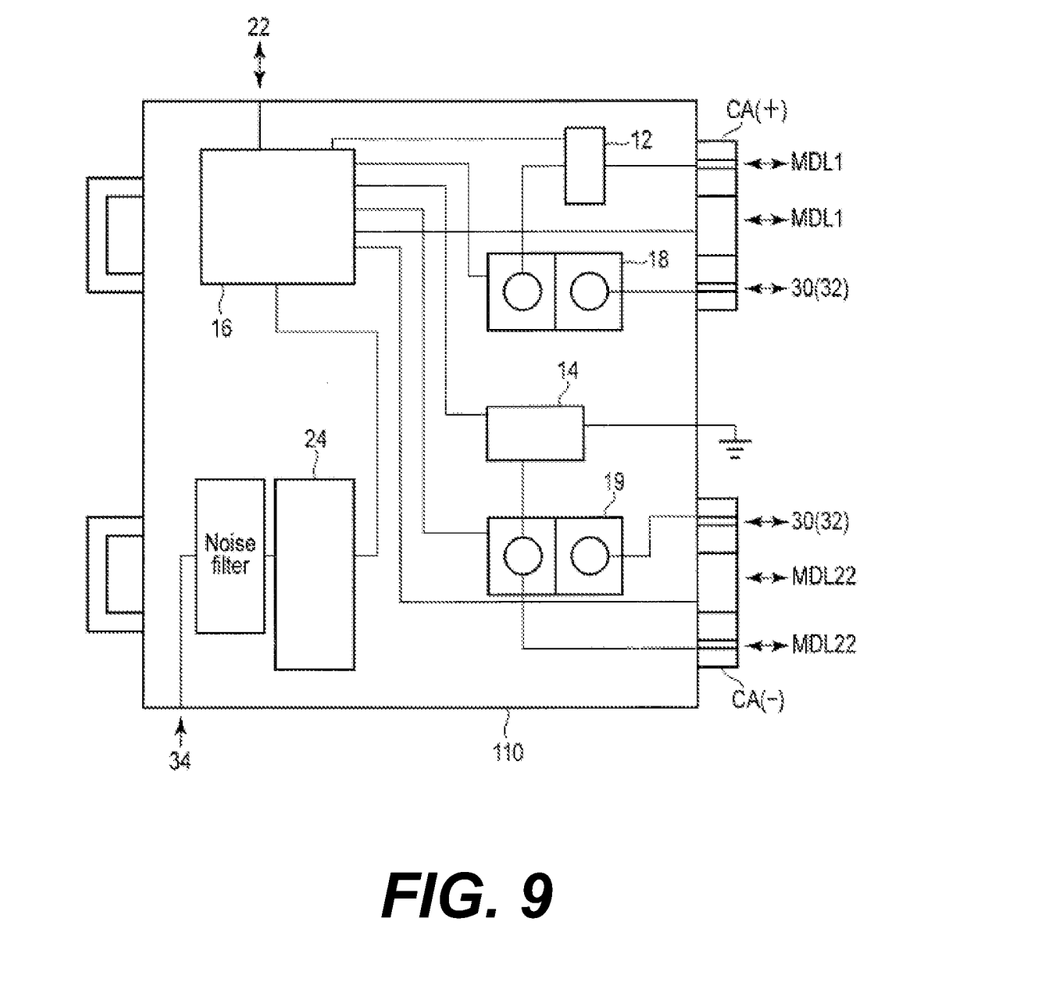
FIG. 9 is a diagram explaining an exemplary configuration of the second drawer of the battery unit shown in FIG. 2.

FIG. 9 is a diagram explaining an exemplary configuration of the second drawer 110 of the battery unit 20 shown in FIG. 2. The second drawer 110 contains a noise filter, in addition to the current sensor 12, leakage sensor 14, battery management unit 16, switch devices 18 and 19, and DC power supply device 24. The master unit 34 applies an AC voltage of 100 V to the second drawer 110. In the second drawer 110, a voltage of 12 V is applied to the battery management unit 16 through the noise filter and the DC power supply device 24. The battery management unit 16 supplies power to the current sensor 12, leakage sensor 14 and switch devices (open-close contactors) 18 and 19. The first composite connector CA, for example, is used as main-circuit interface for the second drawer 110, battery unit 10 and battery terminal board 30. The battery module MDL provided in the battery unit 10 and the switching means 32 provided in the battery terminal board 30 are fitted in recesses A1 and A2 of the first composite connector CA, respectively. Communication connectors CN1 and CN2, both provided in the first composite connector CA, are connected to communication connectors CN3 and CN4 of the second composite connector CB, respectively. Each first drawer 100 may have a fan and a service plug on the side on which the handle is provided.

Figure 6:
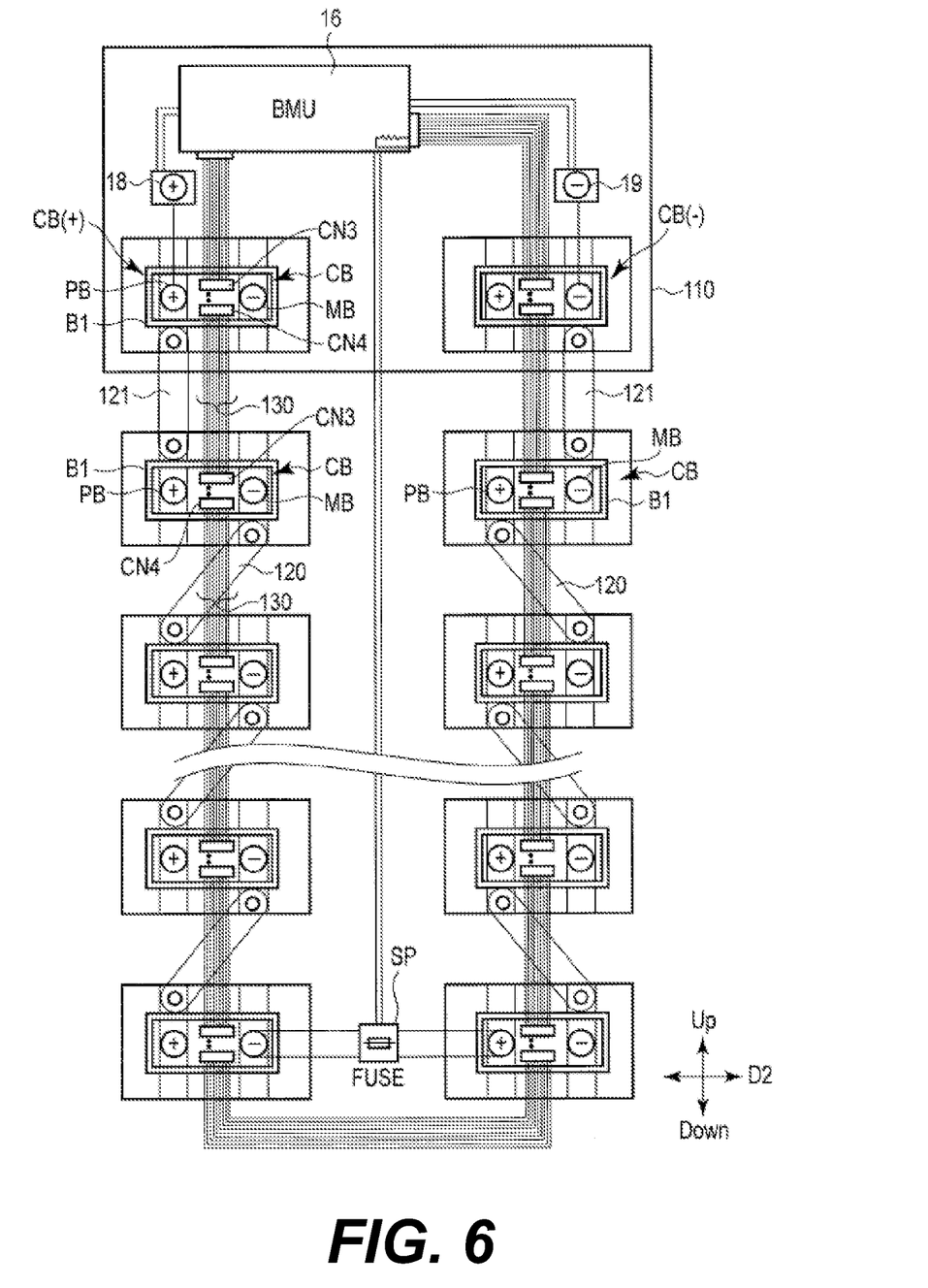
FIG. 6 is a diagram explaining an exemplary configuration of connection of the main-circuit lines and communication lines in the battery unit shown in FIG. 2.
Figure 7:
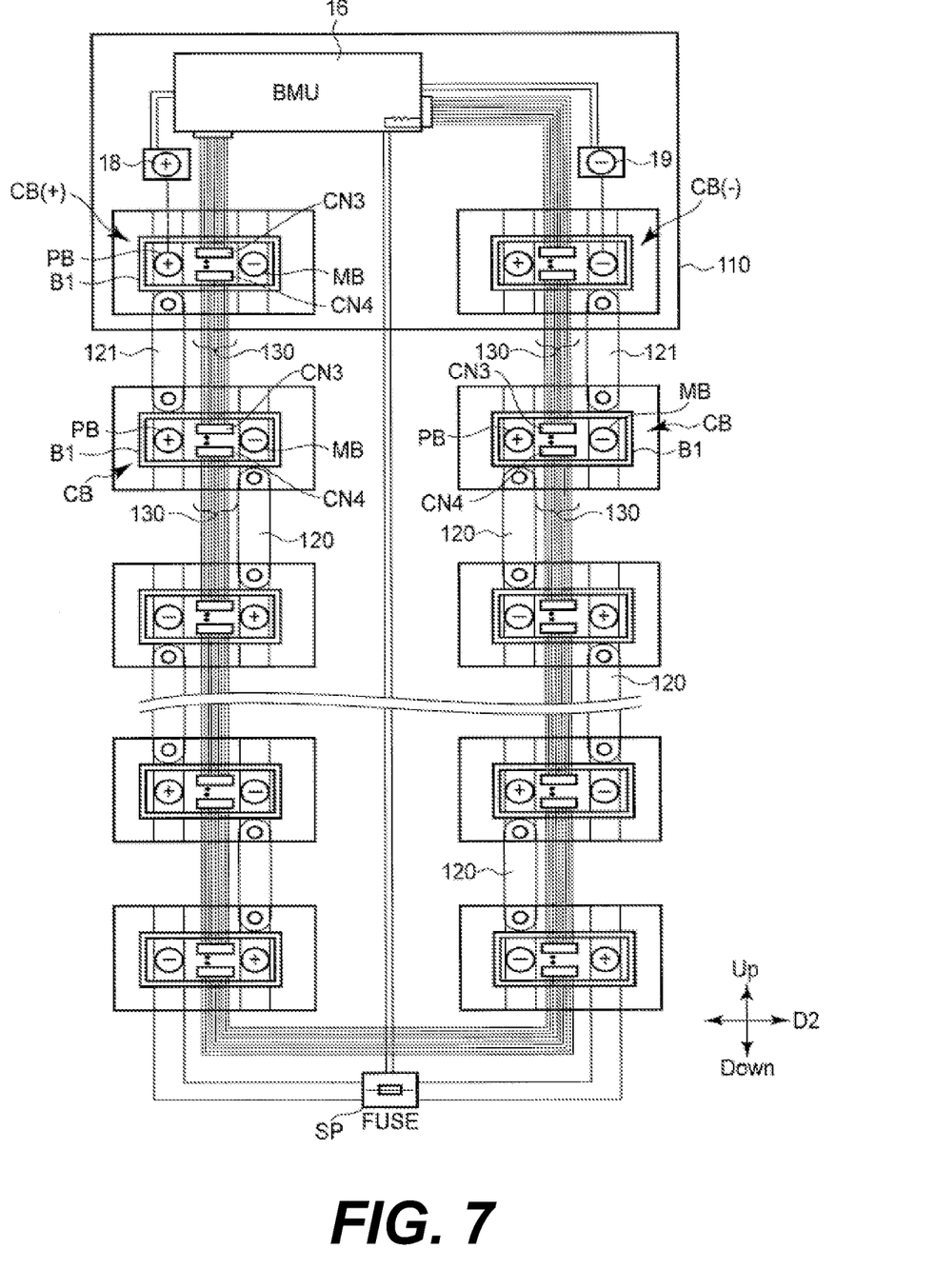
FIG. 7 is a diagram explaining another exemplary configuration of connection of the main-circuit lines and communication lines in the battery unit shown in FIG. 2.
Figure 8:
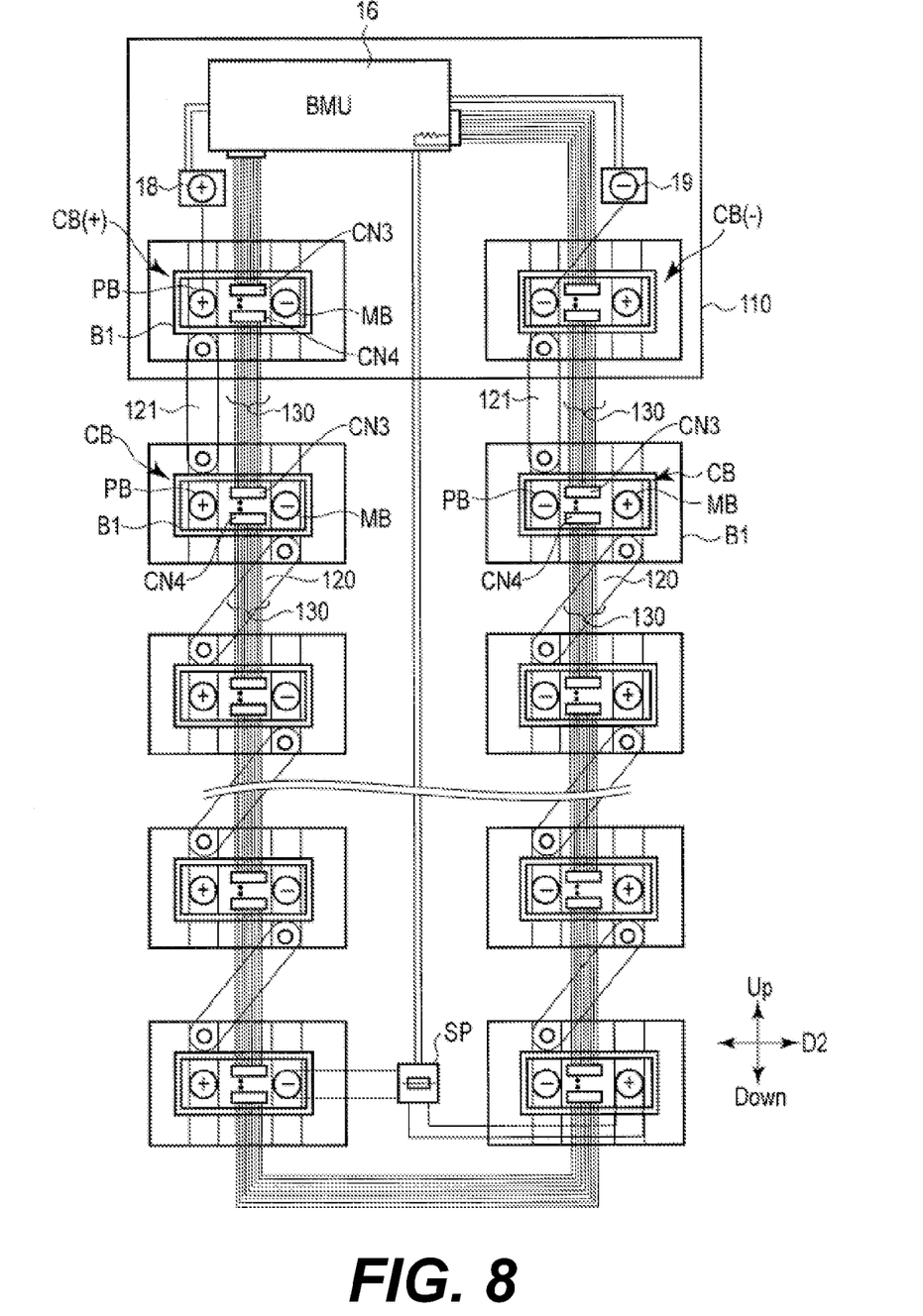
FIG. 8 is a diagram explaining still another exemplary configuration of connection of the main-circuit lines and communication lines in the battery unit shown in FIG. 2.

FIG. 6 is a diagram explaining an exemplary connection of the main-circuit lines and communication lines in the battery unit 10 shown in FIG. 2. FIG. 6 shows only the components related to the connection of the main-circuit lines and communication lines, not showing any other components. In FIG. 6 to FIG. 8, only the second composite connector CB of the first stage, which should be connected to the first composite connector CA of the second drawer 110 is shown for simplicity of explanation. As shown in FIG. 6, the second composite connector CB of the first stage is secured to the housing 10A. A connection bar 121 connects the second composite connector CB of the first stage to the second composite connector CB of the second stage arranged below the second composite connector CB of the first stage. The connector that connects the second drawer 110 to the first drawers 100 may be secured to the second drawer 110, not to the housing 10A.

In the configuration of FIG. 6, the anode connecting parts PB of the respective second composite connectors CB are arranged in the same order as the cathode connecting parts MB thereof, in the second direction D2.

To achieve the main-circuit line connection, each of connection bars 120 electrically connects the anode connecting part PB and cathode connecting part MB of one second composite connector CB so that the battery modules MLD may be connected in series between the switch devices 18 and 19 provided in the second drawer 110.

Thus, the second drawer 110 is held on the uppermost shelf. To the uppermost shelf, two second composite connectors CB are secured, which are juxtaposed in the second direction D2. The anode connecting part PB of one of these composite connectors CB is connected to the switch device 18 held in the second drawer 110. The cathode connecting part MB of the other composite connectors CB is connected to the switch device 19 provided in the second drawer 110.

The anode connecting part PB connected to the switch device 18 is electrically connected by the connection bar 121 to the anode connecting part PB of the second composite connector CB secured to the immediately lower shelf. The cathode connecting part MB connected to the switch device 19 is electrically connected by the connection bar 121 to the cathode connecting part MB of the second composite connecter CB secured to the immediately lower shelf. The connection bar 121 is secured, at both ends in screw engagement, to the connection part B2 of the second composite connecter CB.

The second shelf and any lower shelf holds two first drawers 100 juxtaposed in the second direction D2 are inserted. On each shelf, the first drawer 100 of the left column is at the high-potential side, and the first drawer 100 of the right column is at the low-potential side.

In the second shelf and any lower shelf, the second composite connecter CB on the high-potential side has its cathode connecting part MB connected by a connection bar 120 to the anode connecting part PB of the second composite connector CB on the immediately lower shelf.

In the second shelf and any lower shelf, the second composite connecter CB on the low-potential side has its anode connecting part PB connected by a connection bar 120 to the cathode connecting part MB of the second composite connector CB on the immediately lower shelf.

In the lowest shelf, the cathode connecting part MB of the second composite connector CB on the high-potential side is connected to the anode connecting part PB of the second composite connector CB on the low-potential side, by the service plug SP and connection bars 120. Each connection bar 120 is fastened by screws, at both ends, to the connection part B2 of one second composite connecter CB.

Cables 130 are connected to communication connectors CN3 and CN4 of each second composite connector CB. Communication connector CN3 of the second composite connector CB secured to the uppermost shelf is connected by a cable 130 to the battery management unit 16.

Communication connector CN4 of the second composite connector CB is connected by a cable 130 to communication connector CN3 of the second composite connector CB provided on the immediately lower shelf.

In the second shelf and any lower shelf, communication connector CN4 of the second composite connector CB is similarly connected by a cable 130 to communication connector CN3 of the second composite connector CB provided on the immediately lower shelf. In the lowest shelf, communication connectors CN4 of the second composite connector CB juxtaposed in the second direction D2 are connected by a cable 130.

In this embodiment, the cables 130 are arranged in the housing 10A, not exposed to the space in which any first drawer 100 is inserted or to the space in which the second drawer 110 is inserted. Therefore, the connection bars 120 and cables 130 connecting the second composite connectors CB are spaced apart in the first direction D1.

The CAN communication standard, for example, may be applied to the communication path of the battery unit 10. In this case, the communication path must be branched in order to connect the battery modules MDL to a bus. In most battery apparatus for use in vehicles, a cable customized for connecting battery modules is branched. In this embodiment, the communication connector of each first composite connector CA is branched, having communication connectors CN1 and CN2, and each second composite connector CB is branched, having communication connectors CN3 and CN4. As a result, the battery modules can be used in various combinations.

Therefore, the battery unit 10 can have various configurations, by changing only the length of the cables 130 of the standard type that connect the battery modules MDL. Note that the general-use connector commercially available can be used as branching connector 4.

Assume that the CAN communication standard is applied to the communication path. Then, the line extending from the connector 2CN of the assembled battery monitoring device substrate, for example, CMU, to the branching connector 4 is 300 mm long, because the stub length should be 300 mm or less as stated in ISO11898-2.

A mating detection line is provided in the communication path between the first composite connector CA and the second composite connector CB. More precisely, of the two connection pins of communication connectors CN1 and CN2 of the first composite connector CA, one is made shorter than the other and is connected to the mating detection line. The short connection pin is inserted after the long pin as the composite connectors CA and CB are connected to each other, and is pulled out before the long pin as the composite connectors CA and CB are disconnected from each other. Hence, the assembled battery monitoring device 2 and the battery management unit 16 can determine whether the short pin is fitted, thereby to detect whether the composite connectors CA and CB have been connected to each other. The assembled battery monitoring device 2 and the battery management unit 16 can inform any higher management device of a reliable connection of the main-circuit lines and communication lines.

Hitherto, in the process of assembling a battery unit or replacing any battery module with a new one in the battery unit, it is very troublesome to secure the main-circuit lines and communication lines to the battery module and to the battery management unit, and also to repair the battery unit as needed. It has therefore been demanded that a battery unit be provided, in which the main-circuit lines and communication lines can be connected easily in safety.

As described above, the main-circuit lines and communication lines connect the assembled battery monitoring devices 2 to the battery management unit 16, in a simple pattern, or as if drawing a picture with a single stroke. Since the main-circuit lines and communication lines connect the second composite connectors CB in this way, the battery units 10 can be assembled easily in safety as the first drawers 100 and the second drawer 110 are inserted into the housing 10A. As a result, an erroneous line arrangement can be prevented in assembling and maintaining each battery unit 10.

In each battery unit 10, the cables 130 connecting communication connectors CN3 and CN4 are of the same specification. In other words, the cables 130 are simplified in specification. This helps to prevent errors in assembling and maintaining each battery unit 10.

In each battery unit 10, the anode connecting part PB and cathode connecting part MB of a second composite connector CB are arranged in the same order in the second direction D2 as in any other second composite connector CB. The first drawers 100 can therefore have the same configuration. This also helps to prevent errors in assembling and maintaining each battery unit 10.

In this embodiment, the connection bars 120 intersect with the cables 130. That is, the connection bars 120 constituting a part of the main-circuit line path do not extend parallel to the cables 130 constituting the other part of the main-circuit line path. Therefore, it is possible to reduce the influence of the noise generated from, for example, the magnetic field around each connection bar 120. The influence of the noise can be further reduced since the connection bars 120 are not adjacent to the cables 130. Hence, the degradation of the communication between the assembled battery monitoring devices and the battery management unit can be suppressed in each battery unit of this embodiment.

By definition, two lines are considered parallel if they make an angle of 0 or 180°, not intersecting with each other in the same plane. Therefore, the cables 130 are not parallel to the connection bars 120 if the angle x between any cable 130 and any connection bar 120 satisfies $0° \leq x < 180°$ or $180° < x < 360°$.

It is desirable to make any two connection bars not orthogonal to each other. If two lines are orthogonal in the same plane, the connection bars will extend parallel to, and inevitably influencing, one another.

Any two lines orthogonal to each other intersect with each other in the same plane, at 90 or 270° (one perpendicular to the other). By definition of two dimensions, this means that a cable 130 and a connection bar 120 intersect with each other at an angle x such that $0° \leq x < 90°$, $90° < x < 270°$ or $270° < x < 360°$. By definition of three dimensions, the angle is extended to a solid angle.

In practice, the cables 130 may be slacken. In this case, each cable 130 is supposed either parallel or orthogonal to a virtually straight line connecting communication connectors CN3 and CN4. If any connection bar is not straight, it will be assumed to extend along a virtually straight line connecting an anode connecting part PB and a cathode connecting part MB, thereby to calculate the angle.

As shown in FIG. 6, the shelves may be arranged in two columns, and the anode connecting part PB and cathode connecting part MB may extend in the same direction. Then, any connection bars in which currents flow in different directions will not extend parallel to one another.

In this embodiment, a service plug SP is used to connect the battery modules MDL in series in any battery unit 10. The service plug SP serves to avoid electrification at any high-voltage unit while the battery unit 10 is being assembled, overhauled or maintained. The service plug SP is positioned at an intermediate potential position in the battery unit 10. If the service plug SP cannot be so positioned because of any design reason, the first drawer 100 holding the battery module MDL connected at the intermediate potential position may be pulled out and be used as service plug. In this case, the service plug SP need not be used at all.

FIG. 7 is a diagram explaining another exemplary connection of the main-circuit lines and communication lines in the battery unit 10 shown in FIG. 2. The components identical to those shown in FIG. 6 are designated by the same numbers and will not be described in detail.

In the battery unit 10 of FIG. 7, the second composite connector CB held in the uppermost shelf has the same connection scheme as shown in FIG. 6. In the second shelf and any lower shelf, the second composite connectors CB are arranged in the same order in the second direction D2, in which the anode connecting part PB and cathode connecting part MB are arranged. Nonetheless, any two second composite connectors CB, one above the other, have their anode connecting part PB and cathode connecting part MB positioned other way around. As a result, the connection bar 120 vertically extents and secured with screws, though the main-circuit lines are electrically connected in the same way as shown in FIG. 6, for the second composite connectors CB provided in the second shelf and any lower shelf.

The main-circuit lines and communication lines may be so electrically connected between the second composite connectors CB as described above. In this case, too, the battery unit 10 can be easily in safety, by inserting the first drawers 100 and the second drawer 110 into the housing 10A, mating the first composite connectors CA with the second composite connectors CB, respectively. Therefore, the erroneous line arranging can be prevented while the battery unit 10 is being assembled or maintained, and the maintenance work can be prevented from becoming complex.

The battery units 10 may be common in the specification of the cables 130 that connect communication connectors CN3 to communication connectors CN4, respectively. In this case, the specification of the cables 130 becomes simple, which prevents erroneous cable arrangement in the assembly or maintenance of the battery unit 10.

In the battery unit 10 of FIG. 7, the connection bars 120, i.e., some of the main-circuit lines, are not orthogonal to the cables 130, i.e., some of the communication lines, and the connection bars 120 never extent near the cables 130. This can suppress the quality degradation of the communication between any assembled battery monitoring device and any battery management unit, as in the battery unit 10 of FIG. 6.

FIG. 8 is a diagram explaining still another exemplary connection of the main-circuit lines and communication lines in the battery unit shown in FIG. 2.

As shown in FIG. 8, at each stage, the anode connecting part PB and cathode connecting part MB of one second composite connector CB are arranged in the order opposite, in the second direction D2, to the anode connecting part PB and cathode connecting part MB of the other second composite connector CB. By contrast, the anode connecting part PB and cathode connecting part MB of any second composite connector CB are arranged in the same order, in the second direction D2, as the anode connecting part PB and cathode connecting part MB of the other second composite connector CB. As a result, the main-circuit lines are electrically connected to the second composite connectors CB provided on each shelf, in the same way as shown in FIG. 6, but the connection bars 120 on the low-potential side are not symmetrical with respect to a vertical line as shown in FIG. 6.

If the main-circuit lines and communication lines are connected in this way between the second composite connectors CB, the battery unit 10 can be assembled easily at safety, by mating the first composite connector CA with the second composite connectors CB, respectively, by inserting the first drawings 100 and the second drawing 110 into the housing 10A. This can not only prevent erroneous line arrangement in the assembly and maintenance of the battery unit 10, but also simplify the maintenance work.

The battery units 10 use cables 130 of the same specification to connect communication connectors CN3 to communication connectors CN4. That is, the specification of the cables 130 is simplified, which can prevent erroneous cable arrangement in both assembly and maintenance of the battery unit 10.

In the battery unit shown in FIG. 8, the connection bars 120, i.e., some of the main-circuit lines, are not orthogonal to the cables 130, i.e., some of the communication lines, and the connection bars 120 never extent near the cables 130. This can suppress the quality degradation of the communication between any assembled battery monitoring device and any battery management unit, as in the battery unit 10 of FIG. 6.

Thus, the embodiment can provide a battery unit in which the main-circuit lines can be connected to the communication lines, easily in safety.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery unit comprising:
    a plurality of battery modules each comprising an assembled battery including a plurality of battery cells and an assembled battery monitoring device configured to detect the temperature and voltage of each battery cell;
    a battery management device configured to communicate with the battery modules;
    a first drawer holding the battery module;
    a second drawer holding the battery management device; and
    a housing containing the first drawer and the second drawer,
        wherein the first drawer and the second drawer comprise first composite connectors secured to a side opposed to a side of the housing, which is almost orthogonal to a direction in which to insert the drawers into the housing, and the housing has second composite connectors which mate with the first composite connectors when the first drawer and the second drawer are inserted into the housing, thereby to connect communication lines between the assembled battery monitoring device and the battery management device and main-circuit lines between the assembled batteries of the battery modules, wherein each first composite connector comprises an anode terminal electrically connected to the anode of the assembled battery, a cathode terminal electrically connected to the cathode of the assembled battery, a male first connector connected to the assembled battery monitoring device, and a first communications connector and a second communications connector arranged between the anode terminal and the cathode terminal; and wherein each second composite connector comprises an anode connecting part connected to the anode terminal, a cathode connecting part connected to the cathode terminal, a female second connector connected to the male first connector, and a third communications connector and a fourth communications connector arranged between the anode connecting part and the cathode connecting part connected to the first and second communications connectors, respectively.

2. The battery unit of claim 1, wherein the housing contains connection bars serving as main-circuit lines between the second composite connectors and cables serving as communication lines between the second composite connectors; and the connection bars are orthogonal to the cable.

3. The battery unit of claim 2, wherein the connection bars intersect with the cables at an angle x, where $0°\leq x<180°$ or $180°<x<360°$.

4. The battery unit of claim 3, wherein the cables includes a mating detection line to detect whether the first composite connector and the second composite connector have been connected to each other, the first connector comprises a plurality of connection pins including at least one pin shorter than any other and connected to the mating detecting line.

5. The battery unit of claim 2, wherein the connection bars intersect with the cables at an angle x, where $0°\leq x<90°$, $90°<x<270°$ or $270°<x<360°$.

6. The battery unit of claim 5 wherein the cables includes a mating detection line to detect whether the first composite connector and the second composite connector have been connected to each other, the first connector comprises a plurality of connection pins including at least one pin shorter than any other and connected to the mating detecting line.

7. The battery unit of claim 2, wherein the first connector is a branching connector for branching an output of the assembled battery, and the second connector has a plurality of communication connectors mating with the branching connector.

8. The battery unit of claim 2, wherein the cables includes a mating detection line to detect whether the first composite connector and the second composite connector have been connected to each other, the first connector comprises a plurality of connection pins including at least one pin shorter than any other and connected to the mating detecting line.

9. The battery unit of claim 2, further comprising a gate control device contained in the second drawer and configured to control communication between the battery management device and an external apparatus, a current sensor connected in series to the main-circuit lines of the battery modules, a switch device configured to disconnect the main-circuit line, a service plug provided between two adjacent intermediate assembled batteries.

10. The battery unit of claim 1, further comprising a gate control device contained in the second drawer and configured to control communication between the battery management device and an external apparatus, a current sensor connected in series to the main-circuit lines of the battery modules, a switch device configured to disconnect the main-circuit line, a service plug provided between two adjacent intermediate assembled batteries.

* * * * *